(12) United States Patent
Sakai

(10) Patent No.: US 11,720,293 B2
(45) Date of Patent: Aug. 8, 2023

(54) PRINTING APPARATUS AND METHOD OF PRODUCING PRINTED ITEM

(71) Applicant: SEIKO EPSON CORPORATION, Tokyo (JP)

(72) Inventor: Toshifumi Sakai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/664,433

(22) Filed: May 23, 2022

(65) Prior Publication Data
US 2022/0374175 A1 Nov. 24, 2022

(30) Foreign Application Priority Data
May 24, 2021 (JP) .................. 2021-086731

(51) Int. Cl.
*G06F 3/12* (2006.01)

(52) U.S. Cl.
CPC .......... *G06F 3/1205* (2013.01); *G06F 3/1208* (2013.01); *G06F 3/1253* (2013.01); *G06F 3/12* (2013.01); *G06F 3/1204* (2013.01)

(58) Field of Classification Search
CPC .... G06F 3/1205; G06F 3/1208; G06F 3/1253; G06F 3/12; G06F 3/1204

USPC ......................................... 358/1.2
See application file for complete search history.

(56) References Cited

U.S. PATENT DOCUMENTS

| 2006/0133844 | A1* | 6/2006 | Konno | ........... B41J 3/60 |
| | | | | 399/82 |
| 2006/0159480 | A1* | 7/2006 | Mima | ........... G03G 15/00 |
| | | | | 399/82 |

FOREIGN PATENT DOCUMENTS

JP 2009-262340 A 11/2009

* cited by examiner

*Primary Examiner* — Darryl V Dottin
(74) *Attorney, Agent, or Firm* — Global IP Counselors, LLP

(57) ABSTRACT

When first print data and second print data are selected as a target of collective printing and when a first print setting applied to printing of the first print data and a second print setting applied to printing of the second print data are inconsistent with each other, a printing apparatus provides a user with a first procedure for making the first print setting and the second print setting consistent with each other, and when the first print setting and the second print setting are consistent with each other, the printing apparatus performs collective printing of the first print data and the second print data.

10 Claims, 5 Drawing Sheets

PRINTING APPARATUS AND METHOD OF PRODUCING PRINTED ITEM

The present application is based on, and claims priority from JP Application Serial Number 2021-086731, filed May 24, 2021, the disclosure of which is hereby incorporated by reference herein in its entirety.

BACKGROUND

1. Technical Field

The present disclosure relates to a printing apparatus and a method of producing a printed item.

2. Related Art

JP-A-2009-262340 discloses an image forming apparatus that performs printing processing in accordance with a print job, stores a set value which has been used for the printing processing and which is not specified in the print job, and performs reprinting processing by using the set value.

According to the technique described in JP-A-2009-262340, for example, when double-sided printing, layout printing, or the like is performed in accordance with two print jobs, a user may be required to spontaneously pay attention to whether settings of the print jobs are consistent with each other.

SUMMARY

According to an aspect, a printing apparatus includes: a storage medium that stores first print data, a first print setting applied to printing of the first print data, second print data, and a second print setting applied to printing of the second print data; a guiding section that, when the first print data and the second print data are selected as a target of collective printing and when the first print setting and the second print setting are inconsistent with each other, provides a user with a first procedure for making the first print setting and the second print setting consistent with each other; and a printing section that, when the first print data and the second print data are selected as a target of collective printing and when the first print setting and the second print setting are consistent with each other, performs the collective printing of the first print data and the second print data.

According to another aspect, a method of producing a printed item includes: receiving an instruction for setting first print data and second print data as a target of collective printing from a user; when a first print setting applied to printing of the first print data and a second print setting applied to printing of the second print data are inconsistent with each other, providing the user with a first procedure for making the first print setting and the second print setting consistent with each other; and when the first print setting and the second print setting are consistent with each other, performing collective printing of the first print data and the second print data to produce a printed item.

DESCRIPTION OF EXEMPLARY EMBODIMENTS

Figure 1:
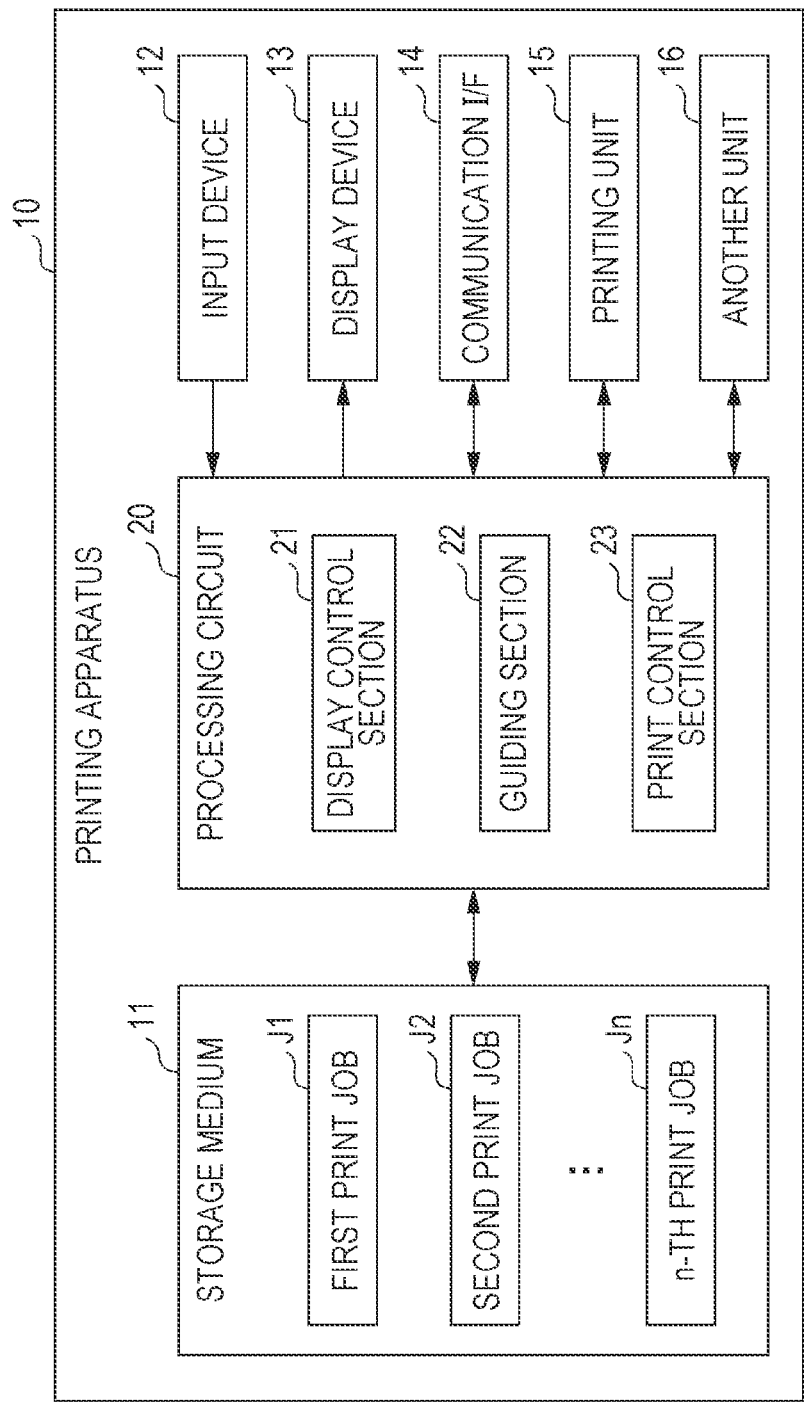
FIG. 1 is a block diagram for explaining a printing apparatus according to an embodiment.

A first embodiment of the disclosure will be described below with reference to the drawings. In the drawings, the same or similar elements will be denoted by the same or similar reference numerals, respectively, and redundant description will be omitted in some cases.

As illustrated in FIG. 1, a printing apparatus 10 according to the embodiment includes a storage medium 11, an input device 12, a display device 13, a communication interface (I/F) 14, a printing unit 15, and a processing circuit 20. The printing apparatus 10 prints an image according to document data on a sheet-like printing object. For example, the printing object includes at least one selected from a group consisting of paper, resin, metal, ceramic, woven fabric, nonwoven fabric, and the like. The printing apparatus 10 has a so-called box function of storing document data on the storage medium 11 such that the document data is able to be read and used as necessary.

The printing apparatus 10 may be a multifunctional peripheral having a scan function, a fax function, a copy function, or the like in addition to a print function. That is, the printing apparatus 10 may further include at least one type of another unit 16 selected from a group consisting of a scanner unit, a finisher, a speaker, a fax unit, and the like.

The storage medium 11 includes a non-transitory computer readable medium on which a program indicating a series of processing operations necessary for the processing circuit 20 to operate and various kinds of data are stored. Various media, such as semiconductor memory and disk media, may be adopted as the storage medium 11. The storage medium 11 may be formed of a single piece of hardware or two or more separate pieces of hardware.

A plurality of print jobs J1 to Jn are stored on the storage medium 11. Each of the plurality of print jobs J1 to Jn indicates information that defines a job regarding printing and performed by the printing apparatus 10. The plurality of print jobs J1 to Jn are constituted by a first print job J1, a second print job J2, . . . , and an n-th print job Jn, in which n is an integer of 2 or more.

Figure 2:
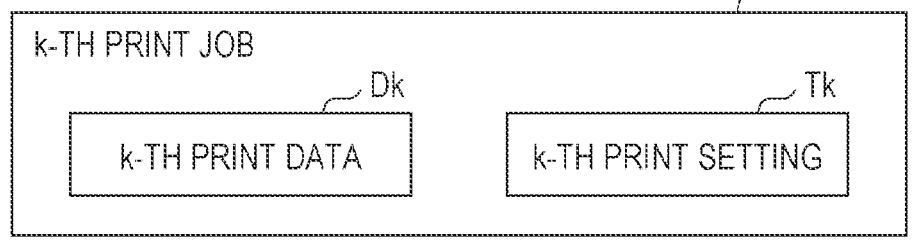
FIG. 2 is a block diagram for explaining a print job.

As illustrated in FIG. 2, a k-th print job Jk includes k-th print data Dk and a k-th print setting Tk. The k-th print job Jk is any of the plurality of print jobs J1 to Jn. That is, k is an integer not less than 1 and not more than n. The k-th print job Jk will be described below as an example of the plurality of print jobs J1 to Jn. The description for the k-th print job Jk is applicable to the other print jobs, such as the first print job J1 and the second print job J2, with the ordinal number k replaced with an integer not less than 1 and not more than n. The same is applicable to the k-th print data Dk and the k-th print setting Tk.

The k-th print data Dk is document data. The k-th print data Dk may be obtained, for example, from another electronic device via the communication I/F 14. The k-th print data Dk may be data indicating a document scanned by a scanner unit or data indicating a facsimile document received by a fax unit.

The k-th print setting Tk is a setting required to be consistent with another setting of data of settings applied to printing of the k-th print data Dk. The k-th print setting Tk may be obtained, for example, from another electronic device via the communication I/F 14 or determined in the printing apparatus 10. The k-th print setting Tk may be stored in the header of the print job Jk or stored as a portion of a data table, which is a list of settings applied to all pieces of print data. For example, when double-sided printing is performed, the k-th print setting Tk indicates a setting of a sheet size corresponding to a size of a printing object and a setting of a sheet type corresponding to a type of the printing object. When the sheet type is limited to a single sheet type in the apparatus, the k-th print setting Tk may indicate a setting of only the sheet size corresponding to the size of the printing object. For simplification, the following description will be given on the assumption that the sheet type is limited to a single sheet type in the apparatus. Note that data of settings other than the print setting, which are applied to printing of the k-th print data Dk, may include various settings, such as a color corresponding to a print color, a print direction corresponding to a direction of the printing object, and print quality corresponding to quality of printing. As settings other than these print settings, settings stored with the print settings are used to perform printing, which will not be mentioned below in some cases for simplification.

The input device 12 detects various user operations and outputs a signal corresponding to a user operation to the processing circuit 20. Various input devices, such as a push button, a touch sensor, and a pointing device, may be adopted as the input device 12. A microphone may be adopted as the input device 12 for the processing circuit 20 to detect a user voice as a user operation by using a voice recognition technique.

The display device 13 displays various images on a screen in accordance with control performed by the processing circuit 20. Various display devices, such as a liquid crystal display, a plasma display, and an organic electro-luminescence display, may be adopted as the display device 13. The input device 12 and the display device 13 may be configured to be integrated with each other as a touch panel display. The display device 13 may be a display device of a projection type that displays an image on a screen by projecting light onto the screen.

The communication I/F 14 establishes a communication link with an electronic device different from the printing apparatus 10 in accordance with control performed by, for example, the processing circuit 20 and is thereby communicably coupled to the electronic device. The communication link may be a wired or wireless communication link or may be a combination of a wired communication link and a wireless communication link. That is, the communication I/F 14 may be directly coupled to the electronic device or indirectly coupled to the electronic device via another communication device. The communication I/F 14 may include, for example, an antenna for transmitting/receiving a signal, a circuit for processing a signal transmitted through the communication link, and a receptacle into which a communication plug is inserted.

The electronic device coupled to the communication I/F 14 may supply the k-th print job Jk to the printing apparatus 10. Examples of the electronic device include a communication terminal, such as a personal computer, a tablet terminal, a smartphone, or a facsimile device, and a storage device, such as a semiconductor memory device or a disk drive.

The printing unit 15 prints an image according to document data of the k-th print job Jk on a sheet-like printing object in accordance with control performed by the processing circuit 20. When adopting an ink jet printing method, the printing unit 15 includes, for example, an ink jet head for ejecting ink droplets onto the printing object and a transport mechanism for transporting the printing object. The printing unit 15 may adopt another printing method, such as an electrophotographic method, an electrostatic method, a dot-impact method, a thermal method, or a thermal transfer method. Moreover, various fluids having another function may be adopted instead of ink.

The processing circuit 20 includes a computational processing device that performs arithmetic processing necessary for the printing apparatus 10 to operate. The processing circuit 20 executes a program stored on, for example, the storage medium 11 to thereby realize various functions of the processing circuit 20, which are described in the embodiment. As a processing device constituting at least a portion of the processing circuit 20, various logic operation circuits, such as a central processing unit (CPU), a digital signal processor (DSP), a programmable logic device (PLD), and an application specific integrated circuit (ASIC), may be adopted. The processing circuit 20 may be formed of a single piece of hardware or two or more separate pieces of hardware.

The processing circuit 20 includes a display control section 21, a guiding section 22, and a print control section 23 as a logical structure. The display control section 21 generates various kinds of image data in accordance with a program stored on, for example, the storage medium 11. The display control section 21 outputs image data to the display device 13 and thereby causes the display device 13 to display various images as a graphical user interface (GUI). Some functions of the display control section 21 are able to be realized by a display control circuit including, for example, a rendering engine and graphics memory.

For example, the display control section 21 controls the display device 13 to display a home screen including various functions, such as a copy function, a scan function, a fax function, and a box function, as options to be selected by the user. The processing circuit 20 performs the box function, for example, when an operation of selecting an option indicating the box function is performed on the input device 12.

Figure 3:
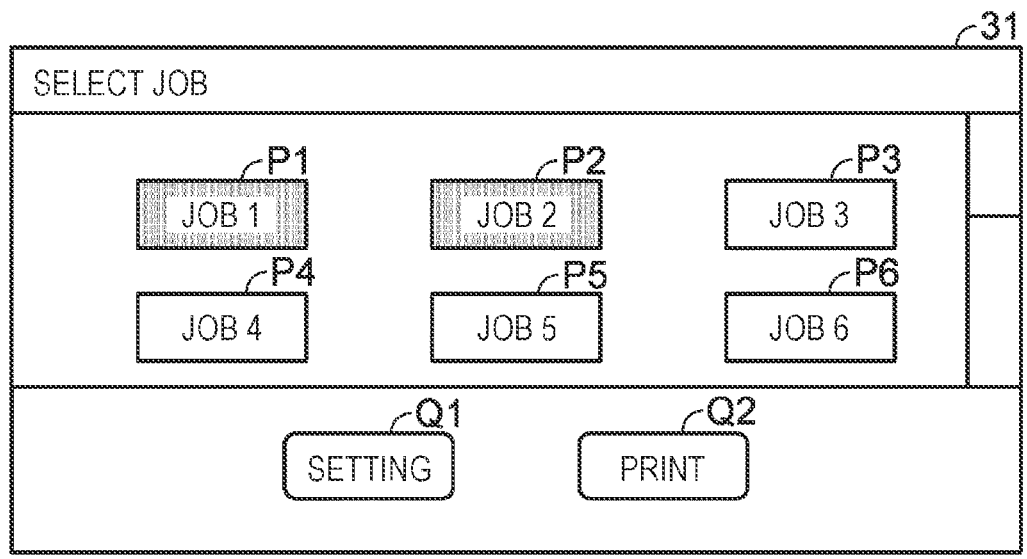
FIG. 3 is a view for explaining an example of a selection screen.

As illustrated in FIG. 3, for example, when the box function starts to be performed, the display control section 21 causes the display device 13 to display, as the GUI, a selection screen 31 including a plurality of print job buttons P1 to P6, a setting button Q1, and a print button Q2. The plurality of print job buttons P1 to P6 include a first print job button P1 indicating a first print job J1, a second print job button P2 indicating a second print job J2, . . . , and a sixth print job button P6 indicating a sixth print job J6.

In the example illustrated in FIG. 3, expressions for identifying print jobs corresponding to the plurality of print job buttons P1 to P6, such as "job 1" of the first print job button P1 and "job 2" of the second print job button P2, are displayed. Although only the six print job buttons P1 to P6 are illustrated in the example of FIG. 3, print job buttons are further displayed sequentially on the selection screen 31 in response to a scrolling operation performed on the input device 12. The number of print job buttons that are able to be displayed on the selection screen 31 may correspond to the number of the plurality of print jobs J1 to Jn stored on the storage medium 11.

The display control section 21 causes the display device 13 to display the selection screen 31 including the plurality of print job buttons corresponding to the plurality of print jobs J1 to Jn. Accordingly, by operating the input device 12, the user is able to change whether or not to select each of the print job buttons. Note that the user is able to select any number of print job buttons at the same time. Since the k-th print job Jk has the specific k-th print data Dk, the operation of the display control section 21 for causing the display device 13 to display the selection screen 31 including the plurality of print job buttons corresponds to the operation for causing the display device 13 to display a plurality of pieces of print data D1 to Dn as options to be selected by the user. A component for making a selection from the plurality of print jobs J1 to Jn is not limited to a button, and various other widgets may be adopted.

In the example illustrated in FIG. 3, the first print job button P1 and the second print job button P2 are emphatically displayed. This means that the first print job button P1 and the second print job button P2 are selected in response to the operation performed on the input device 12 and that the first print job J1 and the second print job J2 are selected as jobs to be performed by the printing apparatus 10. That is, the first print data D1 and the second print data D2 are selected as data to be printed by the printing unit 15. A case in which the first print job J1 and the second print job J2 are selected on the selection screen 31 will be described below appropriately by way of example.

Figure 4:
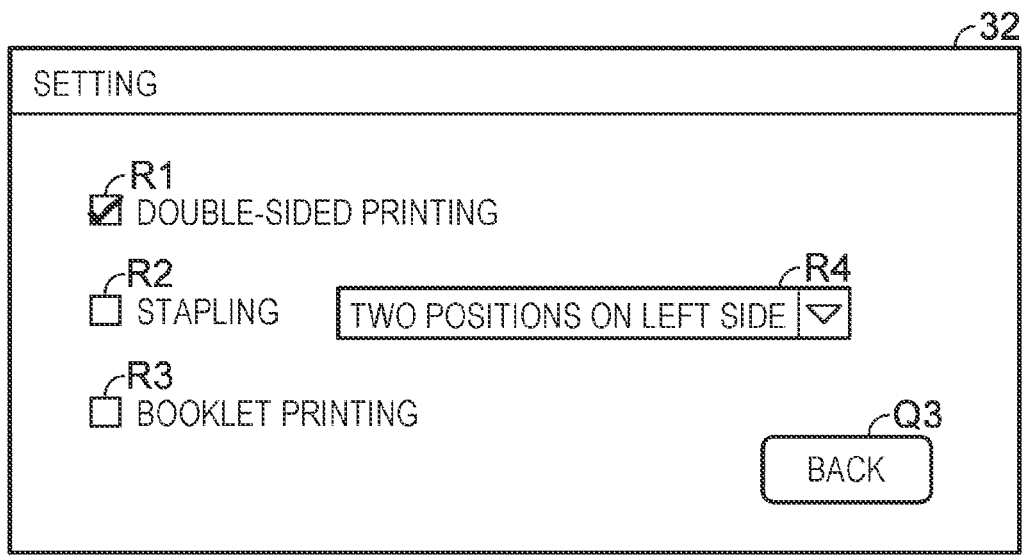
FIG. 4 is a view for explaining an example of an output setting screen.

As illustrated in FIG. 4, when the setting button Q1 is selected by the operation performed on the input device 12, the display control section 21 switches the screen displayed on the display device 13 as the GUI from the selection screen 31 to an output setting screen 32. The output setting screen 32 is a screen on which an output format of a printed item of print data selected on the selection screen 31 is set. The output setting screen 32 includes, for example, a check box R1 for selecting double-sided printing, a check box R2 for selecting stapling, and a check box R3 for selecting booklet printing. A component for selecting an output format is not limited to a check box, and various other widgets, such as a button, a drop-down list, and a context menu, may be adopted. Further, the output setting screen 32 includes a back button Q3 for returning to the selection screen 31.

The output setting screen 32 includes a drop-down list R4 for selecting a detailed setting of an output format of at least one of double-sided printing, stapling, and booklet printing, for example. In the example illustrated in FIG. 4, a binding method of "two positions on left side" is selected as a detailed setting in stapling. A component for selecting a detailed setting is not limited to a drop-down list, and various other widgets, such as a button, a check box, and a context menu, may be adopted. The output setting screen 32 may further include various widgets for selecting a detailed setting of each output format, such as a binding direction, of double-sided printing and booklet printing, for example.

In a case in which collective printing is set, when a plurality of print settings corresponding to a plurality of print jobs selected from the print jobs J1 to Jn on the selection screen 31 are inconsistent with each other, the guiding section 22 provides the user with a first procedure for making the plurality of print settings consistent with each other. For example, in a case in which collective printing is set, when the first print job J1 and the second print job J2 are selected as a plurality of print jobs from the print jobs J1 to Jn, the guiding section 22 determines whether or not a first print setting T1 and a second print setting T2 are consistent with each other.

Collective printing corresponds to collectively printing a plurality of print jobs and has an output format requiring that the plurality of print jobs be identical to each other or satisfy a given condition for at least one setting item. For example, double-sided printing requires that sheet sizes in a plurality of print settings be identical to each other and is thus collective printing. Collective printing is performed by a printing section that includes the printing unit 15 and the print control section 23.

In the present embodiment, a state in which settings for a setting item are "consistent with each other" corresponds to a state in which the setting item satisfies a given condition for collective printing. For example, when "double-sided printing" is selected for an output setting and when "A4" is set as a sheet size of the first print setting T1 and "A3" is set as a sheet size of the second print setting T2, the print settings are inconsistent with each other. In this case, since the sheet sizes of the first print setting T1 and the second print setting T2 are not identical to each other, at least one of the settings is not able to be accurately reflected. On the other hand, when "double-sided printing" is selected for the output setting and when "A4" is set as the sheet size of the first print setting T1 and "A4" is set as the sheet size of the second print setting T2, the print settings are consistent with each other. Moreover, when "double-sided printing" is selected for the output setting and when "A4 plain paper" is set as a setting of a sheet of the first print setting T1 and "A4 auto" is set as the sheet size of the second print setting T2, printing is able to be performed on "A4 plain paper" in both of the print settings, and the print settings are thus consistent with each other. In the double-sided printing, even in a case in which settings of a sheet are not identical to each other as described above, when a condition under which printing is able to be performed on the same sheet is satisfied, print settings are consistent with each other.

Figure 5:
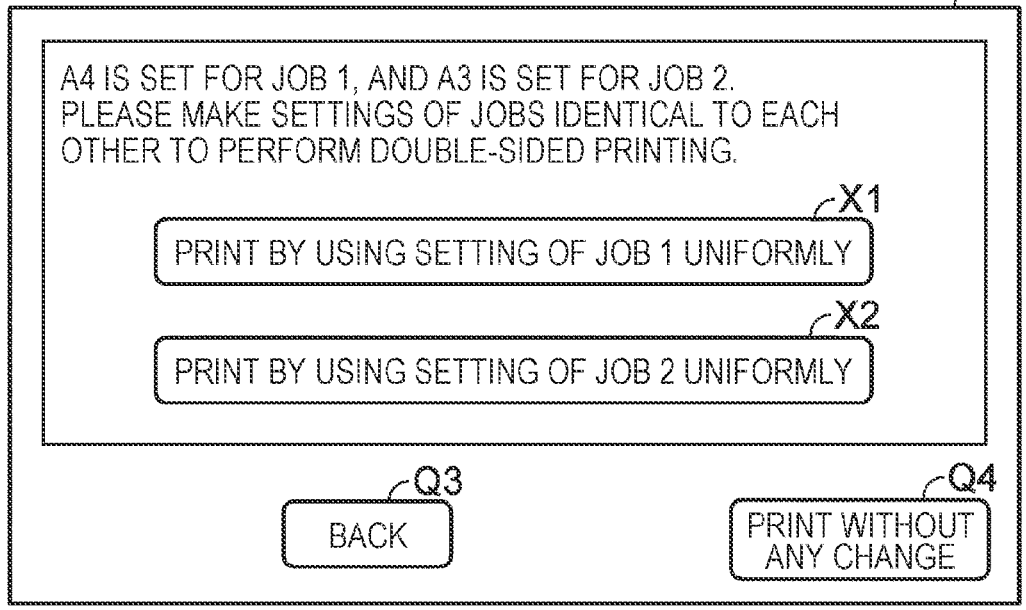
FIG. 5 is a view for explaining an example of a guiding screen.

As illustrated in FIG. 5, when the first print setting T1 and the second print setting T2 that are selected are inconsistent with each other, the guiding section 22 causes the display device 13 to display, as the GUI, a guiding screen 33 for providing the user with the first procedure for making the first print setting T1 and the second print setting T2 consistent with each other. The guiding screen 33 includes an explanatory message, such as "A4 is set for job 1, and A3 is set for job 2. Please make settings of jobs identical to each other to perform double-sided printing." In the explanatory message, an explanation regarding the first procedure, such as a setting item and a set value which are required to be changed to make the first print setting T1 and the second print setting T2 consistent with each other, is described.

The guiding screen 33 includes, for example, a first setting button X1 for selecting the first print setting T1 and a second setting button X2 for selecting the second print setting T2. When the first setting button X1 is selected by an operation performed on the input device 12, the guiding section 22 changes the second print setting T2 so as to be identical to the first print setting T1 as the first procedure. For example, the guiding section 22 changes A3, which is set as the sheet size of the second print setting T2, to A4, which is the sheet size of the first print setting T1. Accordingly, the second print setting T2 is changed such that the second print data D2 is printed after being reduced in size so as to fit the A4 size. In the example illustrated in FIG. 5, an expression indicating that the setting of the first print job J1 is adopted, such as "Print by using setting of job 1 uniformly", is displayed on the first setting button X1.

On the other hand, when the second setting button X2 is selected by an operation performed on the input device 12, the guiding section 22 changes the first print setting T1 so as to be identical to the second print setting T2 as the first procedure. For example, the guiding section 22 changes A4, which is set as the sheet size of the first print setting T1, to A3, which is the sheet size of the second print setting T2. Accordingly, the first print setting T1 is changed such that the first print data D1 is printed after being enlarged in size so as to fit the A3 size. In the example illustrated in FIG. 5, an expression indicating that the setting of the second print job J2 is adopted, such as "Print by using setting of job 2 uniformly", is displayed on the second setting button X2. Performing the first procedure makes the first print setting T1 and the second print setting T2 consistent with each other.

The guiding screen 33 further includes the back button Q3 for returning to the selection screen 31 and a print continue button Q4 for performing a print job without performing the first procedure. In the example illustrated in FIG. 5, an expression indicating that the first print setting T1 and the second print setting T2 are kept in an inconsistent state, such as "Print without any change", is displayed on the print continue button Q4. When the print continue button Q4 is selected, the guiding section 22 performs a second procedure for keeping the first print setting T1 and the second print setting T2 without any change. In this manner, the guiding section 22 provides the user with the first procedure and the second procedure by displaying the guiding screen 33 on the display device 13.

Figure 6:
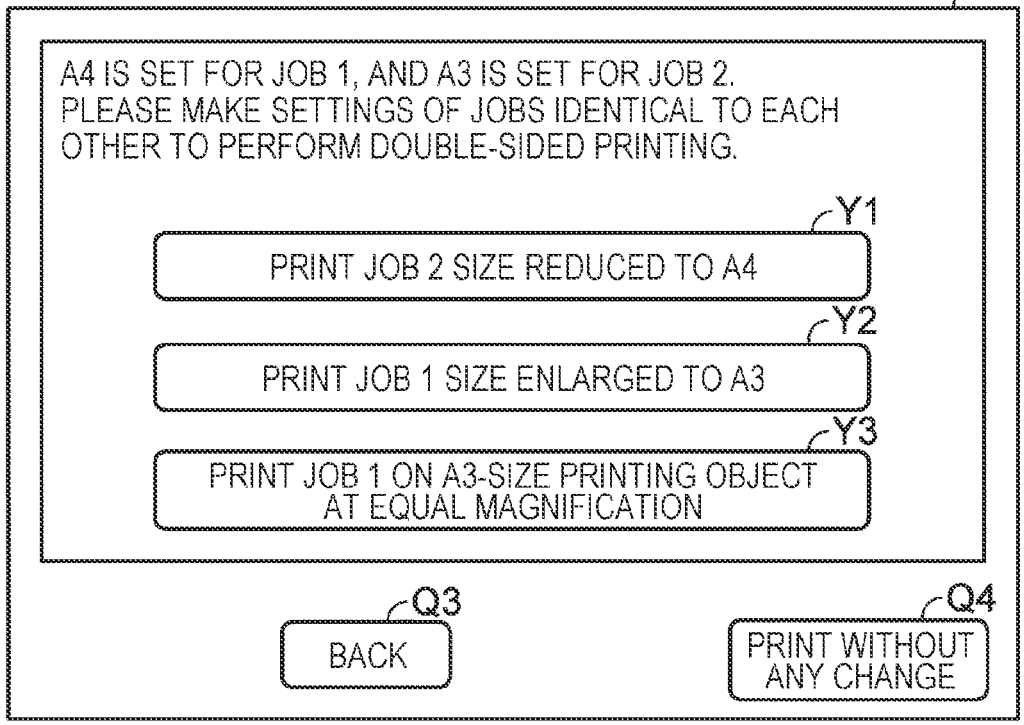
FIG. 6 is a view for explaining another example of the guiding screen.

Moreover, as illustrated in FIG. 6, the guiding section 22 may cause the display device 13 to display, as the GUI, a guiding screen 34 including a first setting button Y1, a second setting button Y2, and a third setting button Y3 on each of which an expression indicating specific content of a change in a print setting is displayed. An expression indicating that A3, which is set as the sheet size of the second print data D2, is changed to A4, such as "Print job 2 size reduced to A4", is displayed on the first setting button Y1. An expression indicating that A4, which is set as the sheet size of the first print data D1, is changed to A3, such as "Print job 1 size enlarged to A3" is displayed on the second setting button Y2.

Further, an expression indicating that collective printing is performed uniformly on an A3-size printing object without changing a sheet size, that is, a scale of the first print setting T1 or the second print setting T2, such as "Print job 1 on A3-size printing object at equal magnification", is displayed on the third setting button Y3. The third setting button Y3 is a button for selecting exceptional processing, such as processing for performing collective printing by using the first print setting T1 and the second print setting T2 which are inconsistent with each other.

The print control section 23 causes the printing unit 15 to perform collective printing for collectively printing the first print data D1 and the second print data D2 by using the first print setting T1 and the second print setting T2 which are made consistent with each other in accordance with the first procedure. For example, when double-sided printing is selected for an output setting, a page of the first print data D1 is printed on one side of a single printing object, and a page of the second print data D2 is printed on the other side of the same printing object. In addition, when booklet printing or stapling is selected for the output setting, a printed item of the first print data D1 and a printed item of the second print data D2 may be bound together.

On the other hand, the print control section 23 causes the printing unit 15 to separately print the first print data D1 and the second print data D2 in accordance with the second procedure. When the second procedure is performed upon selecting the print continue button Q4, the first print setting T1 and the second print setting T2 which are inconsistent with each other are kept. Accordingly, the print control section 23 is not able to perform collective printing and thus sequentially performs, for example, the first print job J1 and the second print job J2 as separate jobs. As a result, for example, when double-sided printing is selected for the output setting, two separate printed items including a printed item on both sides of which only the first print job J1 is printed and a printed item on both sides of which only the second print job J2 is printed are obtained.

Figure 7:
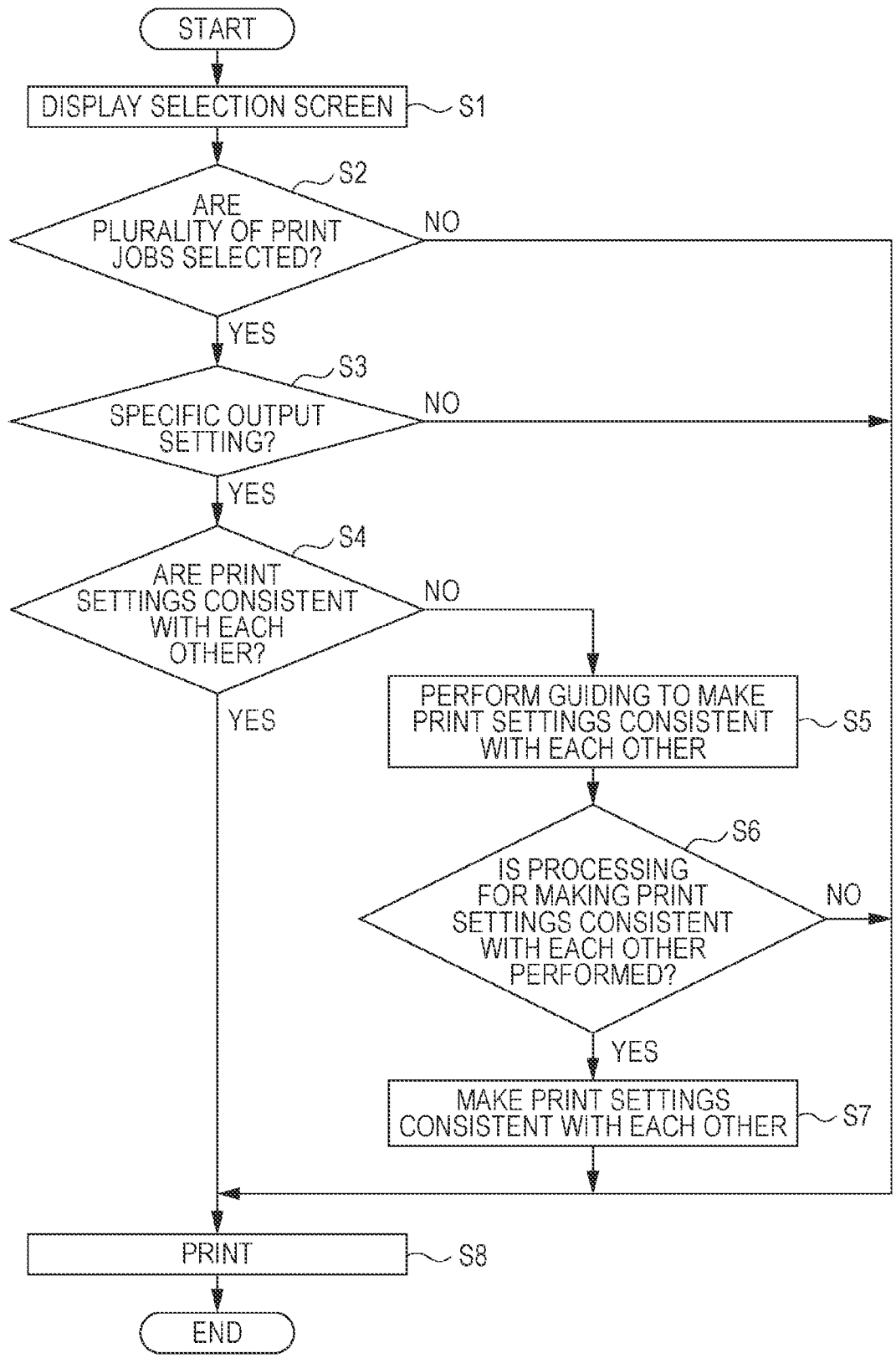
FIG. 7 is a flowchart for explaining an example of operation of the printing apparatus according to the embodiment.

An example of operation of the printing apparatus 10 will be described with reference to a flowchart of FIG. 7. A series of processing operations illustrated in FIG. 7 may start, for example, when the processing circuit 20 starts performing the box function.

First, in step S1, the display control section 21 causes the display device 13 to display the selection screen 31 including a plurality of print job buttons corresponding to the plurality of print jobs J1 to Jn. Accordingly, the display control section 21 causes the display device 13 to display the plurality of pieces of print data D1 to Dn as options to be selected by the user. Further, when the setting button Q1 is selected on the selection screen 31, the display control section 21 causes the display device 13 to display the output setting screen 32 for setting an output format of a printed item of selected print data.

In step S2, when the print button Q2 is selected in a state in which one or more pieces of print data have been selected, the guiding section 22 determines whether or not a plurality of pieces of print data are selected by using the plurality of print job buttons displayed in step S1. When a plurality of pieces of print data are selected, the procedure proceeds to step S3, and when a plurality of pieces of print data are not selected, that is, when only a single piece of print data is selected, the procedure proceeds to step S8.

In step S3, the guiding section 22 determines whether or not a setting selected on the output setting screen 32 displayed in step S1 requires collective printing. When collective printing is required, the guiding section 22 proceeds to the processing of step S4, and when collective printing is not required, the guiding section 22 proceeds to the processing of step S8.

In step S4, the guiding section 22 determines whether or not print settings corresponding to the plurality of pieces of print data selected in step S2 are consistent with each other. When the plurality of print settings are consistent with each other, the guiding section 22 proceeds to the processing of step S8, and when the print settings are inconsistent with each other, the guiding section 22 proceeds to the processing of step S5.

In step S5, the guiding section 22 causes the display device 13 to display the guiding screen 33 for performing guiding to make print settings consistent with each other. By including, for example, the first setting button X1 and the second setting button X2 in the guiding screen 33, the guiding section 22 provides the user with the first procedure for making the plurality of print settings consistent with each other. In addition, by including the print continue button Q4 in the guiding screen 33, the guiding section 22 provides the user with the second procedure for keeping the plurality of print settings without any change.

In step S6, the guiding section 22 determines whether or not to perform processing for making the plurality of print settings consistent with each other, that is, the first procedure, in accordance with the button selected on the guiding screen 33 displayed in step S5. For example, when the first setting button X1 or the second setting button X2 is selected, that is, when the first procedure is performed, the guiding section 22 proceeds to the processing of step S7. For example, when the print continue button Q4 is selected, that is, when the second procedure is performed without performing the first procedure, the guiding section 22 proceeds to the processing of step S8.

In step S7, the guiding section 22 performs the first procedure for making the first print setting T1 and the second print setting T2 consistent with each other in accordance with, for example, the first setting button X1 or the second setting button X2. When the first setting button X1 is selected, the guiding section 22 changes the second print setting T2 so as to be identical to the first print setting T1, and when the second setting button X2 is selected, the guiding section 22 changes the first print setting T1 so as to be identical to the second print setting T2.

In step S8, the print control section 23 prints a print job on a printing object in accordance with the print data selected on the selection screen 31 and the procedures performed before S8 and thereby produces a printed item. When collective printing is required and when settings are consistent with each other from the beginning, collective printing is performed. When collective printing is required and when settings are inconsistent with each other at the beginning but become consistent with each other due to the first procedure being performed, collective printing is performed. When collective printing is not required or when settings are inconsistent with each other due to the second procedure, the print control section 23 simply performs the selected print job. When a single print job is selected, the print job is directly printed.

As described above, even when a plurality of print settings that differ from each other may be selected, since the guiding section 22 provides the user with the first procedure, the printing apparatus 10 does not need a step in which the user spontaneously checks whether or not the print settings are consistent with each other. Moreover, even when print settings which are inconsistent with each other are selected, the printing apparatus 10 is able to perform collective printing by changing a print setting such that the print settings become consistent with each other in accordance with the first procedure. As a result, even when print settings which are inconsistent with each other are selected, collective printing for continuously printing a plurality of pieces of print data is able to be readily performed.

Moreover, since the guiding section 22 provides the user with the second procedure, the printing apparatus 10 is able to separately print a plurality of pieces of print data in accordance with the second procedure without changing print settings which are inconsistent with each other. As a result, the printing apparatus 10 is able to readily sequentially perform a plurality of print jobs without changing the original print jobs J1 to Jn.

Figure 8:
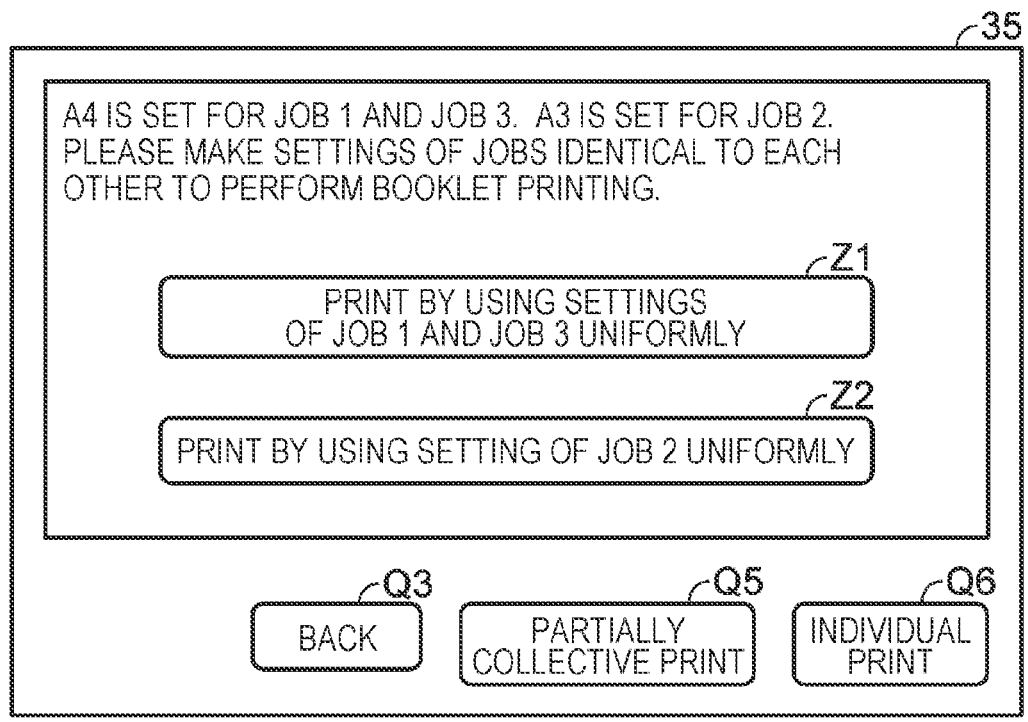
FIG. 8 is a view for explaining still another example of the guiding screen.

For example, as illustrated in FIG. 8, the guiding section 22 may cause the display device 13 to display, as the GUI, a guiding screen 35 on which collective printing of only print jobs of print settings which are consistent with each other of a plurality of selected print settings is able to be selected. A case in which the first print data D1, the second print data D2, and third print data D3 are selected on the selection screen 31 will be described below as a second embodiment. Here, it is assumed that the first print setting T1 and the second print setting T2 are inconsistent with each other and that the first print setting T1 and a third print setting T3 are consistent with each other.

The guiding screen 35 includes an explanatory message, such as "A4 is set for job 1 and job 3. A3 is set for job 2. Make settings identical to each other to perform booklet printing." The guiding screen 35 incudes, for example, a first setting button Z1 for selecting the first print setting T1 and the third print setting T3 and a second setting button Z2 for selecting the second print setting T2. In the example illustrated in FIG. 8, an expression indicating that a setting of the job 2 is changed, such as "Print by using settings of job 1 and job 3 uniformly", is displayed on the first setting button Z1. Moreover, in the example illustrated in FIG. 8, an expression indicating that settings of the job 1 and the job 3 are changed, such as "Print by using setting of job 2 uniformly", is displayed on the second setting button Z2. When the first setting button Z1 is selected, the guiding section 22 changes the second print setting T2 so as to be identical to the first print setting T1 and the third print setting T3 as the first procedure. On the other hand, when the second setting button Z2 is selected, the guiding section 22 changes the first print setting T1 and the third print setting T3 so as to be identical to the second print setting T2 as the first procedure.

The guiding screen 35 includes the back button Q3, a partially-collective-print button Q5 for performing collective printing of some of a plurality of selected print jobs, and an individual-print button Q6 for individually performing a plurality of selected print jobs. When the partially-collective-print button Q5 is selected, the guiding section 22 keeps the first print setting T1, the second print setting T2, and the third print setting T3 without any change and performs a third procedure which leads to partially collective printing. On the other hand, when the individual-print button Q6 is selected, the guiding section 22 keeps the first print setting T1, the second print setting T2, and the third print setting T3 without any change and performs the second procedure which leads to individual printing.

The print control section 23 causes the printing unit 15 to collectively print the first print data D1 and the third print data D3 and causes the printing unit 15 to print the second print data D2 separately from the first print data D1 and the third print data D3 in accordance with the third procedure. That is, the print control section 23 performs collective printing of the first print job J1 and the third print job J3 and separately performs the second print job J2 as a separate job. On the other hand, the print control section 23 causes the printing unit 15 to separately print the first print data D1, the second print data D2, and the third print data D3 in accordance with the second procedure. That is, the print control section 23 performs the first print job J1, the second print job J2, and the third print job J3 as separate jobs.

In this manner, even when only some of a plurality of print settings are consistent with each other, since the guiding section 22 provides the user with the third procedure, the printing apparatus 10 is able to perform collective printing for only the print settings which are consistent with each other in accordance with the third procedure. As a result, the printing apparatus 10 is able to perform collective printing of a plurality of pieces of print data in a range in which respective print settings and output settings are accurately reflected.

Although the embodiments have been described above, the disclosure is not limited thereto. A configuration of each section may be replaced with any configuration having a similar function and may be achieved by a single component or a combination of multiple components. For example, when the user performs an input to a computer of the user, the input device 12 may detect a user operation by performing communication with the computer, or the display device 13 may perform display on a screen of the computer of the user by performing communication with the computer. Any configuration in each of the embodiments may be omitted or added within the technical scope of the disclosure. Such disclosure thus enables a person skilled in the art to conceive of various alternate embodiments.

A guiding method of the guiding section 22 is not limited to the aforementioned method, and various methods may be adopted. For example, the first procedure provided by the guiding section 22 may be a procedure in which, when the user operates a single button, a setting is automatically changed so as to be consistent with another setting or in which, when the user operates a single button, a setting screen provided to change a setting including a setting to be changed is displayed to enable the user to change the setting on the setting screen by the user. Further, when print settings become consistent with each other, printing may be automatically performed, or printing may be started when an instruction for performing printing is issued from the user again. Even in a case in which print settings which are inconsistent with each other in the beginning become consistent with each other, when the print continue button Q4 in which "Print without any change" is displayed is continuously displayed and is then selected, the guiding section 22 may perform printing in accordance with the print settings and the other settings at that time. That is, in a case in which the print settings become consistent with each other due to the first procedure being performed when the print continue button Q4 is selected, collective printing is performed. Moreover, the guiding section 22 may guide the user by using voice via a speaker and receive, via a microphone, a user response given by using voice.

Various kinds of collective printing, such as double-sided printing, booklet printing, and layout printing, may be adopted. A setting to be made consistent with another setting to perform collective printing is determined in accordance with a type of collective printing, and the number of types of settings to be made consistent with another setting may be one or more. Various settings, such as a sheet size, a sheet type, and a sheet direction, are considered. Further, as another setting, various items, such as printing speed, a rendering method, and a type of watermark, may be adopted.

Moreover, a storage device coupled to the printing apparatus 10 via a network, such as the Internet, may provide the printing apparatus 10 with the k-th print job Jk. In this manner, for example, at least some functions of the storage medium 11 and the processing circuit 20 may be provided from a server coupled via a network. Moreover, the input device 12, the display device 13, or the like may be separate from the printing apparatus 10, and, for example, a smartphone communicable with the printing apparatus 10 is able to serve as the input device 12 or the display device 13.

In addition to the above, the disclosure, of course, includes various embodiments that are not described above, such as a configuration in which the configurations described above are mutually applied. The technical scope of the disclosure is specified only by the specific items of the disclosure according to the scope of the claims that are reasonably derived from the foregoing description.

What is claimed is:

1. A printing apparatus comprising:
a non-transitory computer readable medium that stores first print data, a first print setting applied to printing of the first print data, second print data different from the first print data, and a second print setting applied to printing of the second print data;
a processing circuit including
a guiding section that
determines whether or not the first print setting and the second print setting for the first print data and the second print data which are selected as a target of collective printing are consistent with each other by comparing the first print setting and the second print setting, and
when the first print data and the second print data are selected as the target of collective printing and when the first print setting and the second print setting are determined to be inconsistent with each other, provides a user with a first procedure for making the first print setting and the second print setting consistent with each other, and
a printing section that that causes a printer to perform the collective printing, when the first print data and the second print data are selected as the target of collective printing and when the first print setting and the second print setting are determined to be consistent with each other, the printing section performing the collective printing of the first print data and the second print data.

2. The printing apparatus according to claim 1, wherein the collective printing includes printing the first print data on one side of a single printing object and printing the second print data on another side of the single printing object.

3. The printing apparatus according to claim 1, wherein the collective printing includes binding a printed item of the first print data and a printed item of the second print data together.

4. The printing apparatus according to claim 1, wherein the first procedure includes changing the second print setting so as to be identical to the first print setting.

5. The printing apparatus according to claim 4, wherein each of the first print setting and the second print setting includes a size of a printing object.

6. The printing apparatus according to claim 1, wherein the guiding section further provides the user with a second procedure for keeping the first print setting and the second print setting without any change together with the first procedure, and
when the second procedure is performed, the printing section separately prints the first print data and the second print data.

7. A printing apparatus comprising:
a non-transitory computer readable medium that stores first print data, a first print setting applied to printing of the first print data, second print data, and a second print setting applied to printing of the second print data; and
a processing circuit including
a guiding section that, when the first print data and the second print data are selected as a target of collective printing and when the first print setting and the second print setting are inconsistent with each other, provides a user with a first procedure for making the first print setting and the second print setting consistent with each other, and a printing section that causes a printer to perform the collective printing, and that, when the first print data and the second print data are selected as a target of collective printing and when the first print setting and the second print setting are consistent with each other, performs the collective printing of the first print data and the second print data, wherein the storage medium further stores third print data and a third print setting applied to printing of the third print data, and when the first print data, the second print data, and the third print data are selected and when the first print setting and the second print setting are inconsistent with each other but the first print setting and the third print setting are consistent with each other, the guiding section further provides the user with a third procedure for keeping the first print setting, the second print setting, and the third print setting without any change, and when the third procedure is performed, the printing section collectively prints the first print data and the third print data and prints the second print data separately from the first print data and the third print data.

8. A method of producing a printed item, the method comprising:

receiving an instruction for setting first print data and second print data as a target of collective printing from a user, the first print data being different form the second print data;

determining whether or not a first print setting applied to printing of the first print data and a second print setting applied to printing of the second print data are consistent with each other by comparing the first print setting and the second print setting;

when determining that the first print setting and the second print setting are inconsistent with each other, providing the user with a first procedure for making the first print setting and the second print setting consistent with each other; and when determining that the first print setting and the second print setting are consistent with each other, performing collective printing of the first print data and the second print data to produce a printed item.

9. The printing apparatus according to claim 1, wherein the guiding section compares setting of a size of a printing object in the first print setting and setting of a size of a printing object in the second print setting, and the guiding section determines that the first print setting and the second print setting are inconsistent with each other when the first print setting and the second print setting satisfy an unprintable setting in which the first print data and the second print data are not printed on a same-size printing object.

10. The printing apparatus according to claim 1, wherein the guiding section determines that the first print setting and the second print setting are consistent with each other when the first print setting and the second print setting are equal to each other, and the guiding section determines that the first print setting and the second print setting are inconsistent with each other when the first print setting and the second print setting are different from each other, and when an auto setting is not set to the first print setting and the second print setting.

\* \* \* \* \*